United States Patent
Lim et al.

(10) Patent No.: US 12,199,281 B2
(45) Date of Patent: Jan. 14, 2025

(54) POSITIVE ELECTRODE ACTIVE MATERIAL AND LITHIUM SECONDARY BATTERY INCLUDING THE SAME

(71) Applicant: ECOPRO BM CO., LTD., Cheongju-si (KR)

(72) Inventors: Ra Na Lim, Cheongju-si (KR); A Reum Yang, Cheongju-si (KR); Gyun Joong Kim, Cheongju-si (KR); Kyung Min Lim, Cheongju-si (KR); Hye Bin Kim, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 0 days.

(21) Appl. No.: 18/189,133

(22) Filed: Mar. 23, 2023

(65) Prior Publication Data

US 2023/0261179 A1    Aug. 17, 2023

Related U.S. Application Data

(63) Continuation of application No. PCT/KR2021/016132, filed on Nov. 8, 2021.

(30) Foreign Application Priority Data

Dec. 4, 2020 (KR) .................. 10-2020-0168858
May 25, 2021 (KR) .................. 10-2021-0067237
(Continued)

(51) Int. Cl.
*H01M 4/36* (2006.01)
*C01G 45/12* (2006.01)
(Continued)

(52) U.S. Cl.
CPC ........ *H01M 4/525* (2013.01); *C01G 45/1228* (2013.01); *C01G 53/50* (2013.01);
(Continued)

(58) Field of Classification Search
None
See application file for complete search history.

(56) References Cited

U.S. PATENT DOCUMENTS 9,337,487 B2    5/2016    Sun et al.
2006/0115733 A1*    6/2006    Nishida ................. H01M 4/366
429/231.1
(Continued)

FOREIGN PATENT DOCUMENTS

CN    103943822 A    7/2014
CN    104347853 A    2/2015
(Continued)

OTHER PUBLICATIONS

English translation of Matsumoto (JP 2016-139569) (Year: 2016).*
(Continued)

*Primary Examiner* — Ronak C Patel
(74) *Attorney, Agent, or Firm* — Studebaker & Brackett PC

(57) ABSTRACT

The present invention relates to a positive electrode active material and a lithium secondary battery including the same, and more particularly, to a positive electrode active material which includes an overlithiated lithium manganese-based oxide including at least lithium, nickel, manganese and a doping metal, and in which the degradation in stability caused by excessive amounts of lithium and manganese in the lithium manganese-based oxide is mitigated and/or prevented by controlling the concentration of a transition metal in the lithium manganese-based oxide for each region, and a lithium secondary battery including the same.

15 Claims, 6 Drawing Sheets

(30) Foreign Application Priority Data

| | | |
|---|---|---|
| Jun. 21, 2021 | (KR) | 10-2021-0080132 |
| Jun. 21, 2021 | (KR) | 10-2021-0080133 |
| Oct. 18, 2021 | (KR) | 10-2021-0138123 |
| Oct. 27, 2021 | (KR) | 10-2021-0144259 |
| Oct. 28, 2021 | (KR) | 10-2021-0145310 |

(51) Int. Cl.
  *C01G 53/00* (2006.01)
  *H01M 4/131* (2010.01)
  *H01M 4/505* (2010.01)
  *H01M 4/525* (2010.01)
  *H01M 10/052* (2010.01)
  *H01M 4/02* (2006.01)

(52) U.S. Cl.
  CPC ............ *H01M 4/131* (2013.01); *H01M 4/366* (2013.01); *H01M 4/505* (2013.01); *H01M 10/052* (2013.01); *C01P 2002/01* (2013.01); *C01P 2004/04* (2013.01); *C01P 2006/40* (2013.01); *H01M 2004/021* (2013.01); *H01M 2004/028* (2013.01)

(56) References Cited

U.S. PATENT DOCUMENTS

2015/0010824 A1   1/2015  Sun et al.
2017/0352880 A1*  12/2017  Son .................. H01M 4/505

FOREIGN PATENT DOCUMENTS

| EP | 2621004 A2 * | 7/2013 | ............ B60L 50/64 |
| EP | 2621004 B1 * | 6/2019 | ............ B60L 50/64 |
| JP | 2006-012426 A | 1/2006 | |
| JP | 2015-015230 A | 1/2015 | |
| JP | 2016-033848 A | 3/2016 | |
| JP | 2016-072179 A | 5/2016 | |
| KR | 10-2013-0001703 A | 1/2013 | |
| KR | 10-2014-0047044 A | 4/2014 | |
| KR | 10-2015-0016129 A | 2/2015 | |
| KR | 10-2015-0069334 A | 6/2015 | |
| KR | 10-2016-0149162 A | 12/2016 | |
| KR | 110-2018-0063862 A | 6/2018 | |

OTHER PUBLICATIONS

English translation of Kaneda et al. (JP 2019-114327). (Year: 2019).*

International Search Report issued in PCT/KR2021/016132; mailed Feb. 14, 2022.

* cited by examiner

POSITIVE ELECTRODE ACTIVE MATERIAL AND LITHIUM SECONDARY BATTERY INCLUDING THE SAME

CROSS-REFERENCE TO RELATED APPLICATION

This application is based on the PCT Application No. PCT/KR2021/016132, filed on Nov. 8, 2021, and claims the benefit of priority from the prior Korean Patent Application No. 10-2020-0168858, filed on Dec. 4, 2020, Korean Patent Application No. 10-2021-0067237, filed on May 25, 2021, Korean Patent Application No. 10-2021-0080132, filed on Jun. 21, 2021, Korean Patent Application No. 10-2021-0080133, filed on Jun. 21, 2021, Korean Patent Application No. 10-2021-0138123, filed on Oct. 18, 2021, Korean Patent Application No. 10-2021-0144259, filed on Oct. 27, 2021, and Korean Patent Application No. 10-2021-0145310, filed on Oct. 28, 2021, the disclosures of which are incorporated herein by reference in its entirety.

TECHNICAL FIELD

The present invention relates to a positive electrode active material and a lithium secondary battery including the same, and more particularly, to a positive electrode active material which includes an overlithiated lithium manganese-based oxide including at least lithium, nickel, manganese and a doping metal and is capable of mitigating and/or preventing the degradation in stability caused by excessive amounts of lithium and manganese in the lithium manganese-based oxide by controlling the concentration of a transition metal in the lithium manganese-based oxide for each region, and a lithium secondary battery including the same.

BACKGROUND ART

Batteries store electrical power by using materials facilitating an electrochemical reaction at a positive electrode and a negative electrode. As a representative example of such batteries, there is a lithium secondary battery storing electrical energy by means of a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is manufactured by charging a liquid organic electrolyte or a polymer electrolyte between the positive electrode and the negative electrode.

As a positive electrode active material of the lithium secondary battery, a lithium composite oxide may be used, and for example, composite oxides such as $LiCoO_2$, $LiMn_2O_4$, $LiNiO_2$, $LiMnO_2$, or a composite oxide in which Ni, Co, Mn or Al is complexed as disclosed in Korean Patent Application Publication No. 10-2015-0069334 (published Jun. 23, 2015) are being studied.

Among the positive electrode active materials, $LiCoO_2$ is most widely used due to excellent lifetime characteristics and charge/discharge efficiency, but it is expensive due to cobalt being a limited resource, which is used as a raw material, and thus has a disadvantage of limited price competitiveness.

Lithium manganese oxides such as $LiMnO_2$ and $LiMn_2O_4$ have advantages of excellent thermal safety and low costs, but also have problems of small capacity and poor high-temperature characteristics. In addition, while a $LiNiO_2$-based positive electrode active material exhibits a battery characteristic such as a high discharge capacity, due to cation mixing between Li and a transition metal, it is difficult to synthesize the $LiNiO_2$-based positive electrode active material, thereby causing a big problem in rate characteristics.

In addition, depending on the intensification of such cation mixing, a large amount of Li by-products is generated. Since most of the Li by-products consist of LiOH and $Li_2CO_3$, they may cause gelation in preparation of a positive electrode paste or cause gas generation according to repeated charge/discharge after the manufacture of an electrode. Residual $Li_2CO_3$ not only increases cell swelling to reduce the number of cycles, but also causes the swelling of a battery.

Various candidate materials for compensating for conventional positive electrode active materials are being mentioned.

For example, studies are being conducted to use an overlithiated lithium manganese-based oxide as a positive electrode active material for a lithium secondary battery, in which an excess of Mn among transition metals is included and a lithium content is larger than the sum of the contents of the transition metals. The overlithiated lithium manganese-based oxide is also referred to as an overlithiated layered oxide (OLO).

Although the OLO has an advantage in that it can theoretically exhibit high capacity under a high voltage operating environment, in fact, due to an excessive amount of Mn contained in the oxide, the electric conductivity is relatively low, and thus the rate characteristic (rate capability) of a lithium secondary battery using OLO is low. As such, when the rate characteristic (rate capability) is low, there is a problem in which charge/discharge capacity and lifetime efficiency (capacity retention) are degraded during the cycling of a lithium secondary battery.

In addition, during the cycling of a lithium secondary battery using OLO, a decrease in charge/discharge capacity or voltage decay may be caused by a phase transition caused by the migration of a transition metal in the lithium manganese-based oxide. For example, when a transition metal in a lithium manganese-based oxide having a layered crystal structure migrates in an unintended direction to induce phase transition, spinel or a crystal structure similar thereto may be generated entirely and/or partially in the lithium manganese-based oxide.

To solve the above-described problems, although there are attempts to improve the problems of OLO through structural improvement and surface modification of particles, such as controlling the particle size of OLO or coating the surface of OLO, these attempts do not reach the level of commercialization.

DISCLOSURE

Technical Problem

In the lithium secondary battery market, the growth of lithium secondary batteries for electric vehicles is driving the market, and accordingly, the demand for positive electrode active materials used in lithium secondary batteries is also continuously increasing.

For example, conventionally, to ensure stability, lithium secondary batteries using LFP have mainly been used, but recently, the use of a nickel-based lithium composite oxide having a larger energy capacity per weight than LFP tends to be increasing.

In addition, recently, nickel-based lithium composite oxides mainly used as positive electrode active materials for high-capacity lithium secondary batteries essentially use three-component metal elements such as nickel, cobalt and manganese or nickel, cobalt and aluminum. However, since cobalt is not only unstable in supply, but also excessively expensive compared to other raw materials, a positive electrode active material with a new composition, which can reduce a cobalt content or exclude cobalt is needed.

Considering the aspects, although an overlithiated lithium manganese-based oxide can meet the above-mentioned expectations of the market, it can be said that the electrochemical characteristics and stability of the lithium manganese-based oxide are still insufficient to replace the commercially available NCM or NCA-type positive electrode active material.

However, compared to other types of commercially available positive electrode active materials, even when the existing overlithiated lithium manganese-based oxides are disadvantageous in terms of electrochemical properties and/or stability, it was confirmed by the present inventors that, when it is possible to control the concentration of a transition metal in the lithium manganese-based oxide for each region, an overlithiated lithium manganese-based oxide can also exhibit commercially available levels of electrochemical properties and stability.

Accordingly, the present invention is directed to providing a positive electrode active material which includes an overlithiated lithium-manganese oxide including at least lithium, nickel, manganese and a doping metal, and in which the degradation in stability caused by excessive amounts of lithium and manganese in the lithium manganese-based oxide is mitigated and/or prevented by controlling the concentration of a transition metal in the lithium manganese-based oxide for each region.

Moreover, the present invention is directed to providing a lithium secondary battery which improves the low rate capability of conventional OLO by using a positive electrode including the positive electrode active material defined in the present invention.

Technical Solution

To solve the above-described technical problems, one aspect of the present invention provides a positive electrode active material which includes an overlithiated lithium manganese-based oxide including at least lithium, nickel, and manganese, and Wherein, when the number of moles of all metal elements in the lithium manganese-based oxide is $M^1$ and the number of moles of nickel is $M^2$, $M^2/M^1$ calculated from the average composition of all metal elements in the core of the lithium manganese-based oxide and $M^2/M^1$ calculated from the average composition of all metal elements in a shell thereof are different.

The lithium manganese-based oxide may be represented by Formula 1 below.

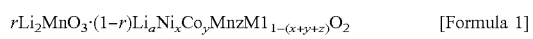

$rLi_2MnO_3 \cdot (1-r)Li_aNi_xCo_yMn_zM1_{1-(x+y+z)}O_2$     [Formula 1]

Wherein,

M1 is at least one selected from Mo, Nb, Fe, Cr, V, Cu, Zn, Sn, Mg, Ru, Al, Ti, Zr, B, Na, K, Y, P, Ba, Sr, La, Ga, Gd, Sm, W, Ca, Ce, Ta, Sc, In, S, Ge, Si and Bi, $0<r\leq0.7$, $0<a\leq1$, $0<x\leq1$, $0<y\leq1$, $0<z\leq1$, and $0<x+y+z\leq1$.

The lithium manganese-based oxide represented by Formula 1 may optionally include cobalt. In addition, when the lithium manganese-based oxide includes cobalt, the ratio of the number of moles of cobalt to the number of moles of all metal element in the lithium manganese-based oxide may be 10% or less, and preferably, 5% or less.

In one embodiment, the lithium manganese-based oxide may be a secondary particle including at least one primary particle. In this case, $M^2/M^1$ (or $M^3/M^1$) calculated from the average composition of all metal elements in the core of the primary particle and $M^2/M^1$ (or $M^3/M^1$) calculated from the average composition of all metal elements in the shell of the primary particle may be different. In another case, $M^2/M^1$ (or $M^3/M^1$) calculated from the average composition of all metal elements in the core of the secondary particle and $M^2/M^1$ (or $M^3/M^1$) calculated from the average composition of all metal elements in the shell of the secondary particle may be different.

In another embodiment, the lithium manganese-based oxide may be a secondary particle including at least one primary particle, and the primary particle may include at least one crystallite. In this case, $M^2/M^1$ (or $M^3/M^1$) calculated from the average composition of all metal elements in the core of the crystallite and $M^2/M^1$ (or $M^3/M^1$) calculated from the average composition of all metal elements in the shell of the crystallite may be different.

Like the above-described various embodiments, when the concentrations of an arbitrary metal element present in the shell and core of a particle (Wherein, the particle may be an arbitrary crystallite present in the primary particle, or an arbitrary primary particle present in the secondary particle or a secondary particle) are different, the particle may be referred to as a core-shell particle. That is, the lithium manganese-based oxide may be a core-shell particle, in which the average compositions of all metal elements constituting the lithium manganese-based oxide in the core and the shell may be different.

In addition, another aspect of the present invention provides a positive electrode including the above-described positive electrode active material.

Moreover, still another aspect of the present invention provides a lithium secondary battery using the above-described positive electrode.

Advantageous Effects

According to the present invention, compared with a commercially-available different type of positive electrode active material, it is possible to improve the limitations of the conventional overlithiated lithium manganese-based oxide, which have several disadvantages in terms of electrochemical properties and/or stability.

Specifically, according to the present invention, as the concentration of a transition metal (particularly, nickel and a doping metal) included in the overlithiated lithium manganese-based oxide is controlled for each region in a particle, the degradation in stability caused by excessive amounts of lithium and manganese in the lithium manganese-based oxide can be mitigated and/or prevented.

In addition, according to the present invention, as the concentration of a transition metal (particularly, nickel and a doping metal) included in the overlithiated lithium manganese-based oxide is controlled for each region in a particle, it is possible to improve the low electrical conductivity of a lithium-manganese oxide to a commercially available level by mitigating the charge-transfer and/or diffusion of Li ions on a particle surface, which are hindered by an excess of Mn.

In addition, according to the present invention, as a concentration gradient of a transition metal is formed between the core and shell of a lithium manganese-based oxide and an abrupt change in concentration of a transition metal in a particle is prevented, the stability of the crystal structure of the lithium manganese-based oxide can be improved.

MODES OF THE INVENTION

Figure 1:
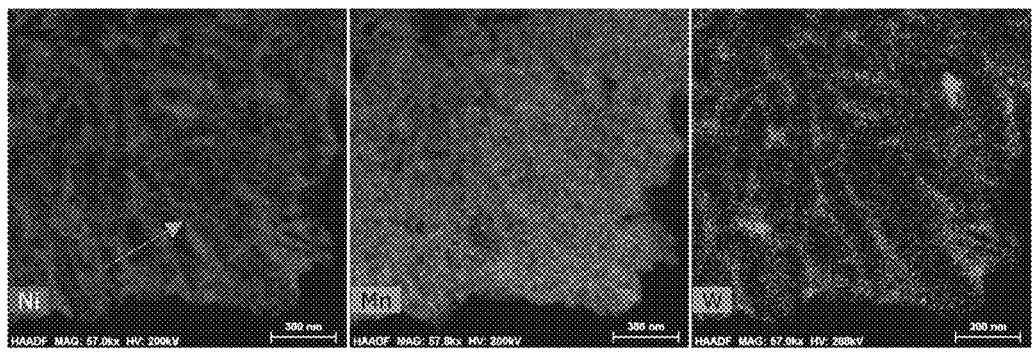
FIG. 1 is a cross-sectional TEM image of a lithium manganese-based oxide included in a positive electrode active material according to Example 1, and shows the distribution of each of Ni, Mn and W elements through EDS mapping of the cross-section of the lithium manganese-based oxide.

In order to better understand the present invention, certain terms are defined herein for convenience. Unless defined otherwise herein, scientific and technical terms used herein will have meanings commonly understood by those of ordinary skill in the art. In addition, unless specifically indicated otherwise, terms in a singular form also include plural forms, and terms in a plural form should be understood to include singular forms as well.

Hereinafter, a positive electrode active material including an overlithiated lithium manganese-based oxide containing at least lithium, nickel, manganese and a doping metal and a lithium secondary battery including the positive electrode active material according to the present invention will be described in further detail.

Positive Electrode Active Material

According to one aspect of the present invention, a positive electrode active material including an overlithiated lithium manganese-based oxide containing at least lithium, nickel, manganese and doping metals is provided. The lithium manganese-based oxide is a composite metal oxide capable of intercalation/deintercalation of lithium ions.

The lithium manganese-based oxide included in the positive electrode active material defined herein may be a secondary particle including at least one primary particle.

The "secondary particle including at least one primary particle" used herein should be interpreted to include a "particle formed by aggregating a plurality of primary particles" or a "non-aggregated particle including a single primary particle."

The primary particle and the secondary particle may each independently have a rod shape, an oval shape and/or an irregular shape. Accordingly, when an average major axis length is used as an indicator indicating the sizes of the primary particle and the secondary particle, the average major axis length of the primary particle constituting the lithium manganese-based oxide may be 0.1 to 5 μm, and the average major axis length of the secondary particle constituting the lithium manganese-based oxide may be 1 to 30 μm. The average major axis length of the secondary particle may vary according to the number of the primary particles constituting the secondary particle, and secondary particles with various average major axis lengths may be included in the positive electrode active material.

In addition, when the lithium manganese-based oxide is a "non-aggregated particle including a single primary particle," or a "particle formed by aggregating a relatively small number of primary particles," the size (average particle diameter) of the primary particles included in the "non-aggregated particle including a single primary particle" or the "particle formed by aggregating a relatively small number of primary particles" may be larger than that of the primary particle (average particle diameter) included in a "secondary particle formed by aggregating tens to hundreds or more of primary particles."

For example, when the lithium manganese-based oxide is a "non-aggregated particle including a single primary particle," or a "particle formed by aggregating a relatively small number of primary particles," the average major axis length of the primary particle may be present in the range of 0.5 to 20 μm. On the other hand, when the lithium manganese-based oxide is a "particle formed by aggregating a plurality (tens to hundreds or more) of primary particles," the average major axis length of the primary particle may be present in the range of 0.1 to 5 μm.

In addition, the primary particle may include at least one crystallite. That is, the primary particle may be present as a particle consisting of a single crystallite or including a plurality of crystallites.

The lithium manganese-based oxide defined herein may be represented by Formula 1 below:

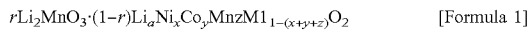
[Formula 1]

Wherein,

M1 is at least one selected from Mo, Nb, Fe, Cr, V, Cu, Zn, Sn, Mg, Ru, Al, Ti, Zr, B, Na, K, Y, P, Ba, Sr, La, Ga, Gd, Sm, W, Ca, Ce, Ta, Sc, In, S, Ge, Si and Bi, $0<r\leq0.7$, $0<a\leq1$, $0<x\leq1$, $0<y\leq1$, $0<z\leq1$, and $0<x+y+z\leq1$.

Wherein, x is preferably 0.6 or less, and z is preferably 0.4 or more.

The lithium manganese-based oxide represented by Formula 1 may optionally include cobalt. In addition, when the lithium manganese-based oxide includes cobalt, the ratio of the number of moles of cobalt to the number of moles of all metal element in the lithium manganese-based oxide may be 10% or less, and preferably 5% or less. On the other hand, the lithium manganese-based oxide represented by Formula 1 may not include cobalt.

The lithium manganese-based oxide represented by Formula 1 is a composite oxide in which a C2/m phase oxide represented by $Li_2MnO_3$ and an R3-m phase oxide represented by $Li_aNi_xCo_yMn_zM1_{1-(x+y+z)}O_2$ coexist. Wherein, the C2/m phase oxide and the R3-m phase oxide are present while forming a solid solution.

In addition, in the lithium manganese-based oxide represented by Formula 1, when r is more than 0.7, the proportion of $Li_2MnO_3$, which is a C2/m phase oxide in the lithium manganese-based oxide, is excessively high, so the discharge capacity of the positive electrode active material may be degraded.

In $Li_aNi_xCo_yMn_zM1_{1-(x+y+z)}O_2$, which is an R3-m phase oxide among the lithium manganese-based oxide represented by Formula 1, x indicating an Ni content is more than 0 and 1 or less. Preferably, to reduce the occurrence of a cation mixing phenomenon in the lithium manganese-based oxide defined herein, x indicating the Ni content in $Li_aNi_xCo_yMn_zM1_{1-(x+y+z)}O_2$ may be more than 0 and 0.6 or less.

In $Li_aNi_xCo_yMn_zM1_{1-(x+y+z)}O_2$, which is an R3-m phase oxide among the lithium manganese-based oxide represented in Formula 1, z indicating an Mn content is more than 0 and less than 1. Preferably, in order for a positive electrode active material including the lithium manganese-based oxide defined herein to exhibit a higher capacity under a high voltage operating environment, z indicating an Mn content in $Li_aNi_xCo_yMn_zM1_{1-(x+y+z)}O_2$ may be 0.4 or more and less than 1.

The positive electrode active material according to the present invention, as represented by Formula 1, includes an overlithiated lithium-manganese oxide including at least lithium, nickel, manganese and a doping metal, and as the concentration of a transition metal in the lithium manganese-based oxide is controlled for each region, the degradation in stability caused by excessive amounts of lithium and manganese in the lithium manganese-based oxide may be mitigated and/or prevented.

In one embodiment, when the lithium manganese-based oxide is a secondary particle including at least one primary particle, the secondary particle may include at least one primary particle in which $M^2/M^1$ calculated from the average composition of all metal elements in the core and $M^2/M^1$ calculated from the average composition of all metal elements in a shell are different.

Wherein, the lithium manganese-based oxide may refer to a "non-aggregated particle including a single primary particle," a "particle formed by aggregating a relatively small number of primary particles" or a "particle formed by aggregating a plurality (tens to hundreds, or more) of primary particles."

As described above, when the concentrations of any metal element present in the shell (or surface) and the core (or center) of a particle are different, the particle may be referred to as a core-shell particle. That is, the lithium manganese-based oxide is a core-shell particle, in which the average composition of all metal elements constituting the lithium manganese-based oxide may be different in the core and the shell.

The shell may occupy at least a part of the surface of the core. That is, the shell may be partially present on the surface of the core, or occupy the entire surface of the core. Meanwhile, when the radius of the core-shell particle is r, the thickness of the shell may be 0.001 r to 0.5 r.

In the present invention, when the number of moles of all metal elements in the lithium manganese-based oxide is $M^1$ and the number of moles of nickel is $M^2$, $M^2/M^1$ calculated from the average composition of all metal elements in the core of the lithium manganese-based oxide and $M^2/M^1$ calculated from the average composition of all metal elements in a shell thereof may be different.

It is well known that an overlithiated lithium manganese-based oxide including an excess of Mn has lower electrical conductivity compared with LCO, or NCM or NCA including an excess of Ni. In addition, common NCM also has a problem of having lowered electrical conductivity as the Mn content increases.

Various reactions occur on the surface of the above-described various types of positive electrode materials, and as the Mn content in the positive electrode active material increases, the charge-transfer and/or diffusion of Li ions on the surface may be hindered, and such a phenomenon may indicate degradation of surface kinetics or surface reaction kinetics.

As described above, the lithium manganese-based oxide defined herein may improve the surface kinetics of the lithium manganese-based oxide by allowing $M^2/M^1$ in the shell and $M^2/M^1$ in the core to be different. Such an effect may be achieved by the differences in $M^2/M^1$ between the core and shell of a primary particle, a secondary particle, a crystallite and/or a single crystal, which will be described below. Alternatively, this effect may be achieved by the differences in $M^3/M^1$ between the core and shell of a primary particle, a secondary particle, a crystallite and/or a single crystal, which will be described below.

When $M^2/M^1$ in the core of the primary particle and $M^2/M^1$ in the shell of the primary particle are different, and $M^2/M^1$ in the shell of the primary particle is higher than that in the core of the primary particle, it may further contribute to improvement of the above-described surface kinetics.

As described above, by making $M^2/M^1$ in the shell of the primary particle larger than $M^2/M^1$ in the core of the primary particle, a phase transition caused by the migration of a transition metal in the lithium manganese-based oxide may be mitigated and/or prevented.

When $M^2/M^1$ in the shell of the primary particle is higher than $M^2/M^1$ in the core of the primary particle, a gradient in which $M^2/M^1$ decreases from the shell to core of the primary particle may be formed. When the gradient in which $M^2/M^1$ decreases from the shell to core of the primary particle is formed, an abrupt change in the concentration of a metal element between the shell and the core of the primary particle may be reduced.

In other words, the gradient of $M^2/M^1$ in the lithium manganese-based oxide defined herein is not imparted by any oxide physically binding to a primary particle and/or a secondary particle, which constitutes the lithium manganese-based oxide, but is imparted by a natural concentration gradient of a metal element constituting a lithium manganese-based oxide. Accordingly, an abrupt change in $M^2/M^1$ in any region in a primary particle and/or a secondary particle, constituting the lithium manganese-based oxide, may be prevented, and thus the stability of the crystal structure of the lithium-manganese-based oxide may be improved.

Meanwhile, when the primary particle is present as a particle including a plurality of crystallites, the concentration of a transition metal in the crystallite may be controlled for each region.

Specifically, the primary particle may include at least one crystallite in which $M^2/M^1$ calculated from the average composition of all metal elements in the core and $M^2/M^1$ calculated from the average composition of all metal elements in a shell are different.

Wherein, when there is at least one crystallite in which $M^2/M^1$ calculated from the average composition of all metal elements in the core of the primary particle and $M^2/M^1$ calculated from the average composition of all metal elements in a shell thereof are different, a concentration gradient of transition metals may be formed in the same direction as the above-described primary particle inside the crystallite.

In other words, $M^2/M^1$ in the shell of the crystallite is higher than $M^2/M^1$ in the core thereof, and a gradient in which $M^2/M^1$ decreases from the shell to core of the crystallite may be formed.

When the primary particle is present as a particle including a plurality of crystallites, the gradient of $M^2/M^1$ present inside the crystallite may contribute to stabilization of the crystal structures of the crystallite and the primary particle including the crystallite and also to improvement of electric conductivity.

When the lithium manganese-based oxide is a "secondary particle formed by aggregating a relatively small number of primary particles" and/or a "secondary particle formed by aggregating a plurality (tens to hundreds or more) of primary particles," the secondary particle itself may be a core-shell particle which has different average compositions of all metal elements constituting the lithium manganese-based oxide in the core and the shell.

In this case, $M^2/M^1$ in the shell of the secondary particle is higher than $M^2/M^1$ in the core of the secondary particle, and a gradient in which $M^2/M^1$ decreases from the shell to core of the secondary particle may be formed. When the gradient of $M^2/M^1$ is formed in the secondary particle, a gradient of $M^2/M^1$ in the primary particle constituting the secondary particle may be optionally present. That is, when the gradient of $M^2/M^1$ is present in the secondary particle, even when there is no gradient of $M^2/M^1$ in the primary particle constituting the secondary particle, the secondary particle itself, as a bulk particle, may be stabilized by the above-described gradient of transition metals.

In addition, in the present invention, when the number of moles of all metal elements in the lithium manganese-based oxide is defined as $M^1$, and the number of moles of a doping metal is defined as $M^3$, $M^3/M^1$ calculated from the average composition of all metal elements in the core of the lithium manganese-based oxide and $M^3/M^1$ calculated from the average composition of all metal elements in the shell of the lithium manganese-based oxide may be different. The effect exhibited by the difference in $M^3/M^1$ calculated from the average composition of all metal elements between the core and shell of the lithium manganese-based oxide is the same as that by the difference in $M^2/M^1$ between the shell and the core, which is described above.

When the lithium manganese-based oxide is a secondary particle including at least one primary particle, $M^3/M^1$ calculated from the average composition of all metal elements in the core of the secondary particle and/or $M^3/M^1$ calculated from the average composition of all metal elements in the shell of the secondary particle may be different.

In another case, the secondary particle may include at least one primary particle in which $M^3/M^1$ calculated from the average composition of all metal elements in the core and/or $M^3/M^1$ calculated from the average composition of all metal elements in a shell are different.

In addition, when the primary particle is present as a particle including a plurality of crystallites, the primary particle may include at least one crystallite in which $M^3/M^1$ calculated from the average composition of all metal elements in the core and $M^3/M^1$ calculated from the average composition of all metal elements in a shell are different.

Like the above-described various cases, when $M^3/M^1$ in the core and $M^3/M^1$ in the shell of each of the crystallite, the primary particle and/or the secondary particle are different, $M^3/M^1$ in the shell of each particle is preferably higher than that in the core thereof. In addition, when $M^3/M^1$ in the shell of each particle is higher than $M^3/M^1$ in the core of each particle, a gradient in which $M^3/M^1$ decreases from the shell to core of the particle may be formed.

In other words, the direction of the gradient of $M^3/M^1$ formed in the lithium manganese-based oxide is made in the same direction of the gradient of $M^2/M^1$ formed in the lithium manganese-based oxide, and as the gradients of $M^2/M^1$ and $M^3/M^1$ in the lithium manganese-based oxide are formed, the degradation in stability caused by lithium and manganese present in excessive amounts in the lithium manganese-based oxide may be mitigated and/or prevented.

Meanwhile, for various core-shell type positive electrode active materials (e.g., NCA/NCM) as well as the core-shell type lithium manganese-based oxide mentioned herein, it is common that a precursor is synthesized using metal aqueous solutions with different compositions to vary the compositions of metal elements in the core and a shell or form a concentration gradient of metal elements between the core and the shell.

However, when the positive electrode active material defined herein is a lithium manganese-based oxide, before roasting (first thermal treatment), by coating a hydroxide precursor with Ni and/or Co, it is possible to realize the difference in $M^2/M^1$ between the core and shell of the final product (lithium manganese-based oxide), and it is also possible to form a gradient of $M^2/M^1$ from the core to the shell. In addition, according to another embodiment of the present invention, before roasting (first thermal treatment), it is possible to realize the difference in $M^2/M^1$ between the core and the shell by including a doping metal in a lithium manganese-based oxide, instead of coating a hydroxide precursor with Ni and/or Co, and forming a gradient of the concentration of the doping metal(s) (represented as $M^3/M^1$ herein).

Accordingly, positive electrode active materials including an overlithiated lithium manganese-based oxide according to various embodiments defined herein may exhibit commercially available levels of electrochemical properties and stability.

In another embodiment, on at least a part of the surface of the lithium manganese-based oxide, at least one metal oxide represented by Formula 2 below may be present.

$$Li_bM2_cO_d$$ [Formula 2]

Wherein,

M2 is at least one selected from Ni, Mn, Co, Fe, Cu, Nb, Mo, Ti, Al, Cr, Zr, Zn, Na, K, Ca, Mg, Pt, Au, P, Eu, Sm, W, Ce, V, Ba, Ta, Sn, Hf, Ce, Gd and Nd, $0 \leq b \leq 8$, $0 < c \leq 8$, and $2 \leq d \leq 13$.

The metal oxide represented by Formula 2 may be formed by reacting at least a part of metal elements (lithium, manganese, cobalt and/or a doping metal) constituting a lithium manganese-based oxide with Li present on the surface of the lithium manganese-based oxide.

The metal oxide may improve the electrochemical properties of the lithium manganese-based oxide by reducing lithium-containing impurities (or referred to as residual lithium) present on the surface of the lithium manganese-based oxide, and acting as a diffusion path of lithium ions.

When the lithium manganese-based oxide is a core-shell particle, the metal oxide may also be integrally present with the shell.

Accordingly, the metal oxide may be present on at least a part of the surface(s) of a crystallite, a primary particle and/or a secondary particle, constituting a lithium manganese-based oxide.

The metal oxide is an oxide in which lithium and an element represented by M2 are complexed, or an M2 oxide, and the metal oxide may be, for example, $Li_aW_bO_c$, $Li_aZr_bO_c$, $Li_aTi_bO_c$, $Li_aNi_bO_c$, $Li_aCo_bO_c$, $Li_aAl_bO_c$, $Co_bO_c$, $Al_bO_c$, $WbO_c$, $Zr_bO_c$ or $Ti_bO_c$. The above-mentioned examples are merely provided to help understanding, and the metal oxide defined herein is not limited thereto.

In addition, the metal oxide may be an oxide in which lithium and at least two elements represented by M2 are complexed, or may further include an oxide in which lithium and at least two elements represented by M2 are complexed. The oxide in which lithium and at least two elements represented by M2 are complexed may be, for example, $Li_a(W/Ti)_bO_c$, $Li_a(W/Zr)_bO_c$, $Li_a(W/Ti/Zr)_bO_c$, and $Li_a(W/Ti/B)_bO_c$, but the present invention is not necessarily limited thereto.

Lithium Secondary Battery

According to another embodiment of the present invention, a positive electrode including a positive electrode current collector and a positive electrode active material layer formed on the positive electrode current collector may be provided. Wherein, the positive electrode active material layer may include the above-described positive electrode active material according to various embodiments of the present invention as a positive electrode active material.

Accordingly, a detailed description of the lithium manganese-based oxide will be omitted, and only the remaining components not described above will be described below. In addition, hereinafter, the above-described lithium manganese-based oxide is referred to as a positive electrode active material for convenience.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 μm, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included optionally as needed.

Wherein, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by coating the positive electrode current collector with a positive electrode slurry composition prepared by dissolving or dispersing the positive electrode active material, and optionally, a binder and a conductive material in a solvent, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to prepare a positive electrode.

In addition, in another exemplary embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator film and an electrolyte, which are interposed between the positive electrode and the negative electrode. Wherein, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator film, and optionally, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer may be formed by coating the negative electrode current collector with a negative electrode slurry composition including the negative electrode active material, a conductive material, and a binder optionally included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0<\beta<2$), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer may be prepared by coating the negative electrode current collector with a negative electrode slurry composition prepared by dissolving or dispersing a negative electrode active material, and optionally, a binder and a conductive material in a solvent, and drying the coated composition, or may be prepared by casting the negative electrode slurry composition on a separate support and then laminating a film delaminated from the support on the negative electrode current collector.

Meanwhile, in the lithium secondary battery, a separator film is not particularly limited as long as it is generally used in a lithium secondary battery to separate a negative electrode from a positive electrode and provide a diffusion path for lithium ions, and particularly, the separator film has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator film including a ceramic component or a polymer material may be used to ensure thermal resistance or mechanical strength, and may be optionally used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which is able to be used in the production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolactone, or F-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of approximately 1:1 to 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt is preferably in the range of 0.1 to 2.0 M. When the concentration of the lithium salt is included in the above-mentioned range, the electrolyte has suitable conductivity and viscosity and thus can exhibit excellent electrolytic performance. Therefore, lithium ions can effectively migrate.

To enhance lifetime characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Wherein, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifespan characteristics, it is useful in portable devices such as a mobile phone, a notebook computer and a digital camera and an electric vehicle field such as a hybrid electric vehicle (HEV).

The outer shape of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to still another exemplary embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to exemplify the present invention, and thus the scope of the present invention will not be construed not to be limited by these examples.

Preparation Example 1. Preparation of Positive Electrode Active Material

Example 1

(a) Preparation of Precursor

In a reactor, NaOH and $NH_4OH$ were added to a mixed aqueous solution in which $NiSO_4 \cdot 6H_2O$ and $MnSO_4 \cdot H_2O$ are mixed in a molar ratio of 40:60 and stirred. The temperature in the reactor was maintained at 45° C., and a $N_2$ gas was introduced into the reactor while a precursor synthesis reaction proceeded. After the reaction was completed, washing and dehydration were performed, thereby obtaining a $Ni_{0.4}Mn_{0.6}(OH)_2$ precursor having an average particle diameter of 4 μm.

(b) First Thermal Treatment

After increasing the temperature of a calcination furnace with an $O_2$ atmosphere at a rate of 2° C./min, and maintaining the temperature at 550° C., the precursor obtained in (a) was thermally treated for 5 hours, followed by furnace cooling.

(c) Second Thermal Treatment

A mixture was prepared by mixing the oxide-state precursor obtained in (b), LiOH (Li/(metals except Li) mol ratio=1.25) as a lithium compound, and 1.0 mol % of $WO_3$ relative to the metal elements in the precursor.

Subsequently, after increasing the temperature of a calcination furnace with an $O_2$ atmosphere at a rate of 2° C./min, and maintaining the temperature at 900° C., the mixture was thermally treated for 8 hours and subjected to furnace cooling, thereby eventually obtaining a positive electrode active material containing an overlithiated lithium manganese-based oxide having an average particle diameter of 4 μm.

Example 2

(a) Preparation of Precursor

A nickel-manganese hydroxide precursor was prepared in the same manner as in Example 1.

(b) Precursor Coating

A $CoSO_4 \cdot 7H_2O$ aqueous solution, NaOH and $NH_4OH$ were introduced into a reactor in which the precursor obtained in (a) was being stirred. Wherein, $CoSO_4 \cdot 7H_2O$ was weighed so as to be 10 mol % and then input. After the completion of the reaction, the resultant was washed and dehydrated, and then dried at 150° C. for 14 hours, thereby obtaining a coated precursor.

(c) First Thermal Treatment

After increasing the temperature of a calcination furnace with an $O_2$ atmosphere at a rate of 2° C./min, and maintaining the temperature at 550° C., the precursor obtained in (b) was thermally treated for 5 hours, followed by furnace cooling.

(d) Second Thermal Treatment

A mixture was prepared by mixing the oxide-state precursor obtained in (c) with LiOH (Li/(metals except Li) mol ratio=1.25) as a lithium compound.

Subsequently, after increasing the temperature of a calcination furnace with an $O_2$ atmosphere at a rate of 2° C./min, and maintaining the temperature at 850° C., the mixture was thermally treated for 8 hours and subjected to furnace cooling, thereby eventually obtaining a positive electrode active material containing an overlithiated lithium manganese-based oxide having an average particle diameter of 4 μm.

Example 3

A positive electrode active material was prepared in the same manner as in Example 2, except that (d) was performed as follows.

(d) Second Thermal Treatment

A mixture was prepared by mixing the oxide-state precursor obtained in (c), LiOH (Li/(metals except Li) mol ratio=1.25) as a lithium compound, and 1.0 mol % of $WO_3$ relative to the metal elements in the precursor.

Subsequently, after increasing the temperature of a calcination furnace with an $O_2$ atmosphere at a rate of 2° C./min, and maintaining the temperature at 850° C., the mixture was thermally treated for 8 hours and subjected to furnace cooling, thereby eventually obtaining a positive electrode active material containing an overlithiated lithium manganese-based oxide having an average particle diameter of 4 μm.

Example 4

(a) Preparation of Precursor

A nickel-manganese hydroxide precursor was prepared in the same manner as in Example 1.

(b) Precursor Coating

A $NiSO_4 \cdot 6H_2O$ aqueous solution, NaOH and $NH_4OH$ were introduced into a reactor in which the precursor obtained in (a) was being stirred. Wherein, $NiSO_4 \cdot 6H_2O$ was weighed so as to be 5 mol % and then input. After the completion of the reaction, the resultant was washed and dehydrated, and then dried at 150° C. for 14 hours, thereby obtaining a coated precursor.

(c) First Thermal Treatment

After increasing the temperature of a calcination furnace with an $O_2$ atmosphere at a rate of 2° C./min, and maintaining the temperature at 550° C., the precursor obtained in (b) was thermally treated for 5 hours, followed by furnace cooling.

(d) Second Thermal Treatment

A mixture was prepared by mixing the oxide-state precursor obtained in (c) with LiOH (Li/(metals except Li) mol ratio=1.25) as a lithium compound.

Subsequently, after increasing the temperature of a calcination furnace with an $O_2$ atmosphere at a rate of 2° C./min, and maintaining the temperature at 900° C., the mixture was thermally treated for 8 hours and subjected to furnace cooling, thereby eventually obtaining a positive electrode active material containing an overlithiated lithium manganese-based oxide having an average particle diameter of 4 μm.

Example 5

A positive electrode active material was prepared in the same manner as in Example 4, except that (d) was performed as follows.

(d) Second Thermal Treatment

A mixture was prepared by mixing the oxide-state precursor obtained in (c), LiOH (Li/(metals except Li) mol ratio=1.25) as a lithium compound, and 1.0 mol % of $WO_3$ relative to the metal elements in the precursor.

Subsequently, after increasing the temperature of a calcination furnace with an $O_2$ atmosphere at a rate of 2° C./min, and maintaining the temperature at 900° C., the mixture was thermally treated for 8 hours and subjected to furnace cooling, thereby eventually obtaining a positive electrode active material containing an overlithiated lithium manganese-based oxide having an average particle diameter of 4 μm.

Example 6

A positive electrode active material was prepared in the same manner as in Example 2, except that (d) was performed as follows.

(d) Second Thermal Treatment

A mixture was prepared by mixing the oxide-state precursor obtained in (c), LiOH (Li/(metals except Li) mol ratio=1.25) as a lithium compound, and 0.5 mol % of $Nb_2O_5$ relative to the metal elements in the precursor.

Subsequently, after increasing the temperature of a calcination furnace with an $O_2$ atmosphere at a rate of 2° C./min, and maintaining the temperature at 850° C., the mixture was thermally treated for 8 hours and subjected to furnace cooling, thereby eventually obtaining a positive electrode active material containing an overlithiated lithium manganese-based oxide having an average particle diameter of 4 μm.

Example 7

A positive electrode active material was prepared in the same manner as in Example 2, except that (d) was performed as follows.

(d) Second Thermal Treatment

A mixture was prepared by mixing the oxide-state precursor obtained in (c), LiOH (Li/(metals except Li) mol ratio=1.25) as a lithium compound, and 0.5 mol % of $MoO_3$ relative to the metal elements in the precursor.

Subsequently, after increasing the temperature of a calcination furnace with an $O_2$ atmosphere at a rate of 2° C./min, and maintaining the temperature at 850° C., the mixture was thermally treated for 8 hours and subjected to furnace cooling, thereby eventually obtaining a positive electrode active material containing an overlithiated lithium manganese-based oxide having an average particle diameter of 4 μm.

Example 8

(a) Preparation of Precursor

In a reactor, NaOH and NH$_4$OH were added to a mixed aqueous solution in which NiSO$_4$·6H$_2$O and MnSO$_4$·H$_2$O are mixed in a molar ratio of 40:60 and stirred. The temperature in the reactor was maintained at 45° C., and a N$_2$ gas was introduced into the reactor while a precursor synthesis reaction proceeded. After the reaction was completed, washing and dehydration were performed, thereby obtaining a Ni$_{0.4}$Mn$_{0.6}$(OH)$_2$ precursor having an average particle diameter of 4 μm.

(b) First Thermal Treatment

After increasing the temperature of a calcination furnace with an O$_2$ atmosphere at a rate of 2° C./min, and maintaining the temperature at 800° C., the precursor obtained in (a) was thermally treated for 5 hours, followed by furnace cooling.

(c) Precursor Coating

A CoSO$_4$·7H$_2$O aqueous solution, NaOH and NH$_4$OH were introduced into a reactor in which the oxide-state precursor obtained in (b) was being stirred. Wherein, CoSO$_4$·7H$_2$O was weighed so as to be 10 mol % and then input. After the completion of the reaction, the resultant was washed and dehydrated, and then dried at 150° C. for 14 hours, thereby obtaining a coated precursor.

(d) Second Thermal Treatment

A mixture was prepared by mixing the precursor obtained in (c) with LiOH (Li/(metals except Li) mol ratio=1.25) as a lithium compound.

Figure 7:
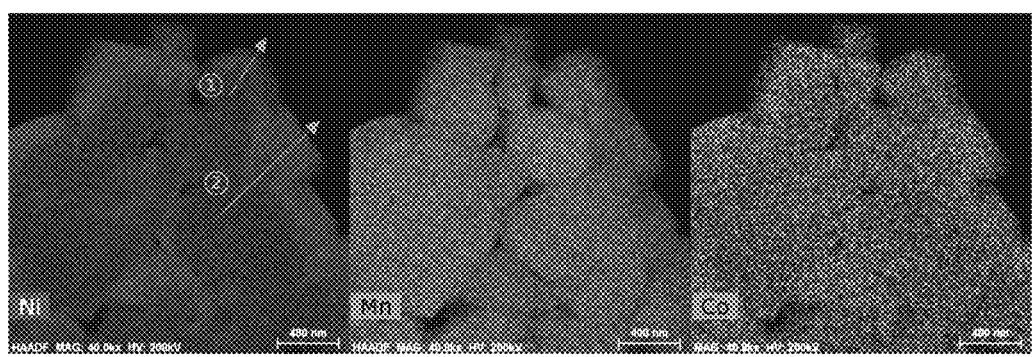
FIG. 7 is a cross-sectional TEM image of a lithium manganese-based oxide included in a positive electrode active material according to Example 8, and shows the distribution of each of Ni, Co and Mn through EDS mapping of the cross-section of the lithium manganese-based oxide.

Subsequently, after increasing the temperature of a calcination furnace with an O$_2$ atmosphere at a rate of 2° C./min, and maintaining the temperature at 1,000° C., the mixture was thermally treated for 16 hours and subjected to furnace cooling, thereby eventually obtaining a positive electrode active material containing an overlithiated lithium manganese-based oxide having an average particle diameter of 5 μm. Wherein, as shown in FIG. 7, it can be confirmed that the average particle diameter of a primary particle constituting a lithium manganese-based oxide included in the positive electrode active material was larger than those of primary particles constituting lithium manganese-based oxides included in the positive electrode active materials according to Examples 1 to 3.

Comparative Example 1

(a) Preparation of Precursor

In a reactor, NaOH and NH$_4$OH were added to a mixed aqueous solution in which NiSO$_4$·6H$_2$O and MnSO$_4$·H$_2$O are mixed in a molar ratio of 40:60 and stirred. The temperature in the reactor was maintained at 45° C., and a N$_2$ gas was introduced into the reactor while a precursor synthesis reaction proceeded. After the reaction was completed, washing and dehydration were performed, thereby obtaining a Ni$_{0.4}$Mn$_{0.6}$(OH)$_2$ precursor having an average particle diameter of 4 μm.

(b) First Thermal Treatment

After increasing the temperature of a calcination furnace with an O$_2$ atmosphere at a rate of 2° C./min, and maintaining the temperature at 550° C., the precursor obtained in (a) was thermally treated for 5 hours, followed by furnace cooling.

(c) Second Thermal Treatment

A mixture was prepared by mixing the oxide-state precursor obtained in (b) with LiOH (Li/(metals except Li) mol ratio=1.25) as a lithium compound.

Subsequently, after increasing the temperature of a calcination furnace with an O$_2$ atmosphere at a rate of 2° C./min, and maintaining the temperature at 900° C., the mixture was thermally treated for 8 hours and subjected to furnace cooling, thereby eventually obtaining a positive electrode active material containing an overlithiated lithium manganese-based oxide having an average particle diameter of 4 μm.

Comparative Example 2

(a) Preparation of Precursor

In a reactor, NaOH and NH$_4$OH were added to a mixed aqueous solution in which NiSO$_4$·6H$_2$O and MnSO$_4$·H$_2$O are mixed in a molar ratio of 40:60 and stirred. The temperature in the reactor was maintained at 45° C., and a N$_2$ gas was introduced into the reactor while a precursor synthesis reaction proceeded. After the reaction was completed, washing and dehydration were performed, thereby obtaining a Ni$_{0.4}$Mn$_{0.6}$(OH)$_2$ precursor having an average particle diameter of 4 μm.

(b) First Thermal Treatment

After increasing the temperature of a calcination furnace with an O$_2$ atmosphere at a rate of 2° C./min, and maintaining the temperature at 800° C., the precursor obtained in (a) was thermally treated for 5 hours, followed by furnace cooling.

(c) Second Thermal Treatment

A mixture was prepared by mixing the oxide-state precursor obtained in (b) and LiOH (Li/(metals except Li) mol ratio=1.25) as a lithium compound.

Subsequently, after increasing the temperature of a calcination furnace with an O$_2$ atmosphere at a rate of 2° C./min, and maintaining the temperature at 1,000° C., the mixture was thermally treated for 16 hours and subjected to furnace cooling, thereby eventually obtaining a positive electrode active material containing an overlithiated lithium manganese-based oxide having an average particle diameter of 5 μm. It can be confirmed that the average particle diameter of a primary particle constituting the lithium manganese-based oxide included in the positive electrode active material increased similarly to that of Example 8.

Preparation Example 2. Manufacture of Lithium Secondary Battery

A positive electrode slurry was prepared by dispersing 90 wt % of each of the positive electrode active materials prepared according to Preparation Example 1, 5.5 wt % of carbon black, and 4.5 wt % of a PVDF binder in 30 g of N-methyl-2 pyrrolidone (NMP). The positive slurry was uniformly applied on an aluminum thin film with a thickness of 15 μm and dried in vacuo at 135° C., thereby manufacturing a positive electrode for a lithium secondary battery.

Lithium foil as a counter electrode for the positive electrode, a porous polyethylene film (Celgard 2300, thickness: 25 μm) as a separator, and a liquid electrolyte prepared by adding LiPF$_6$ at 1.15M in a solvent in which ethylene carbonate and ethyl methyl carbonate were mixed in a volume ratio of 3:7 were used to manufacture a coin cell.

Experimental Example 1. Analysis of Metal Elements in Lithium Manganese-Based Oxide To confirm the change in content of metal elements in a lithium manganese-based oxide prepared according to Preparation Example 1, TEM/EDS analyses were performed. A TEM image of the lithium manganese-based oxide was obtained after cross-sectioning of the lithium manganese-based oxide by FIB.

FIG. 1 is a cross-sectional TEM image of a lithium manganese-based oxide included in a positive electrode active material according to Example 1, and shows the distribution of each of Ni, Mn and W elements through EDS mapping of the cross-section of the lithium manganese-based oxide. In addition, FIG. 2 is a graph (line sum spectrum) showing the change in content of a metal element (Ni, Mn or W) present in a lithium manganese-based oxide through EDS analysis in a direction displayed in the cross-sectional TEM image of FIG. 1.

Figure 2:
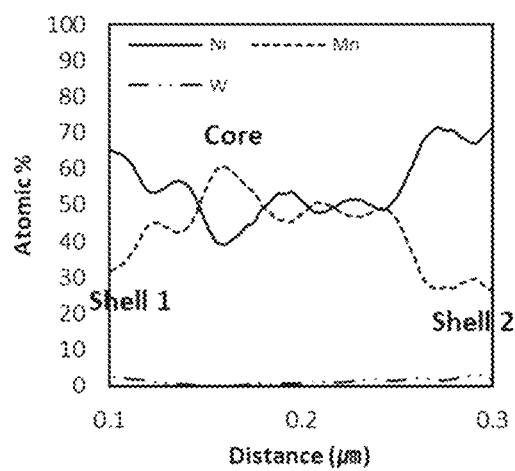
FIG. 2 is a graph (line sum spectrum) showing the change in content of a metal element (Ni, Mn or W) present in a lithium manganese-based oxide through EDS analysis in a direction displayed in the cross-sectional TEM image of FIG. 1.

Referring to FIGS. 1 and 2, the lithium manganese-based oxide included in the positive electrode active material according to Example 1 is a secondary particle including a plurality of primary particles, and it can be confirmed that the concentration gradients of Ni, Mn and W are formed in a direction crossing almost perpendicular to the direction from the shell to core of the secondary particle.

Likewise, it can be confirmed that the concentration gradients of Ni, Mn and W in a direction crossing almost perpendicular to the direction from the shell to core of the secondary particle occurs because $M^2/M^1$ and $M^3/M^1$ calculated from the average composition of all metal elements in the core of the primary particle, and $M^2/M^1$ and $M^3/M^1$ calculated from the average composition of all metal elements in the shell of the primary particle are different.

In addition, it can be confirmed that the concentrations of Ni and W in the secondary particle are higher as closer to the grain boundary between primary particles.

Table 1 below shows the concentrations (mol %) of Ni, Mn and W in the core and shells (shell 1 and shell 2) of a primary particle. The concentrations (mol %) of Ni, Mn and W in the core and shells (shell 1 and shell 2) of a primary particle were calculated from a line EDS spectrum, and the concentrations of Ni, Mn and W in total particles (bulk) were calculated through ICP analysis. Wherein, the shell (shell 1) corresponds to a shell of a primary particle located at one side of the region corresponding to a core of the primary particle based on the direction shown in the cross-sectional TEM image of FIG. 1, and the shell (shell 2) corresponds to a shell of a primary particle located at the other side of the region corresponding to a core of the primary particle based on the direction shown in the cross-sectional TEM image of FIG. 1.

TABLE 1

| $M/M_{total}$ (mol %) | bulk | core | shell 1 | shell 2 |
| --- | --- | --- | --- | --- |
| Ni | 38.2 | 39.1 | 64.7 | 71.6 |
| Mn | 60.7 | 60.7 | 32.7 | 26.4 |
| W | 1.1 | 0.2 | 2.6 | 2.1 |

Referring to the results shown in FIG. 2 and Table 1, $M^2/M^1$ calculated from the average composition of all metal elements in the core of a primary particle is 39.1, and $M^2/M^1$ calculated from the average compositions of all metal elements in each of the shells (shell 1 and shell 2) of the primary particle is 64.7 and 71.6. Therefore, it can be seen that the lithium manganese-based oxide is an aggregate (secondary particle) of primary particles in which $M^2/M^1$ in a shell is higher than $M^2/M^1$ in the core, and a gradient in which $M^2/M^1$ decreases from the shell to the core is formed.

In addition, $M^3/M^1$ calculated from the average composition of all metal elements in the core of a primary particle is 0.2, and $M^3/M^1$ calculated from the average compositions of all metal elements in each of the shells (shell 1 and shell 2) of the primary particle is 2.6 and 2.1. Therefore, it can be seen that the lithium manganese-based oxide includes a primary particle in which $M^3/M^1$ in the shell is higher than $M^3/M^1$ in the core, and a gradient in which $M^3/M^1$ decreases from the shell to the core is formed.

Figure 3:
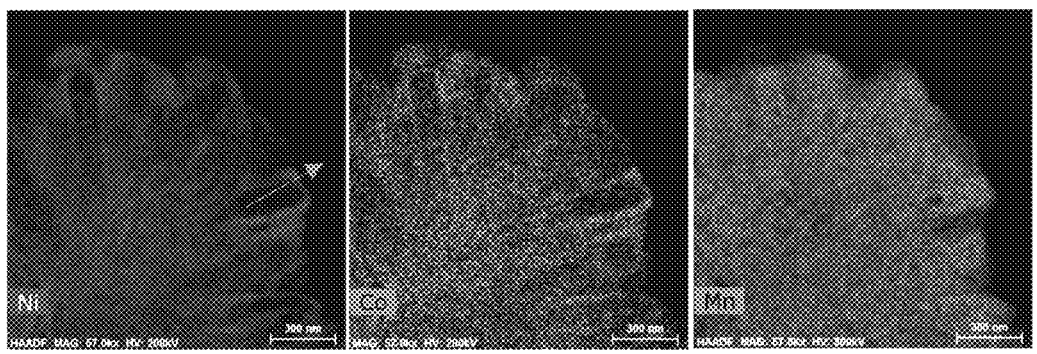
FIG. 3 is a cross-sectional TEM image of a lithium manganese-based oxide included in a positive electrode active material according to Example 2, and shows the distribution of each of Ni, Co and Mn elements through EDS mapping of the cross-section of the lithium manganese-based oxide.

FIG. 3 shows a cross-sectional TEM image of a lithium manganese-based oxide included in a positive electrode active material according to Example 2, and shows the distribution of each of Ni, Co and Mn elements through EDS mapping of the cross-section of the lithium manganese-based oxide. In addition, FIG. 4 is a graph (line sum spectrum) showing the change in content of a metal element (Ni, Co, or Mn) present in a lithium manganese-based oxide through EDS analysis in a direction displayed in the cross-sectional TEM image of FIG. 3.

Figure 4:
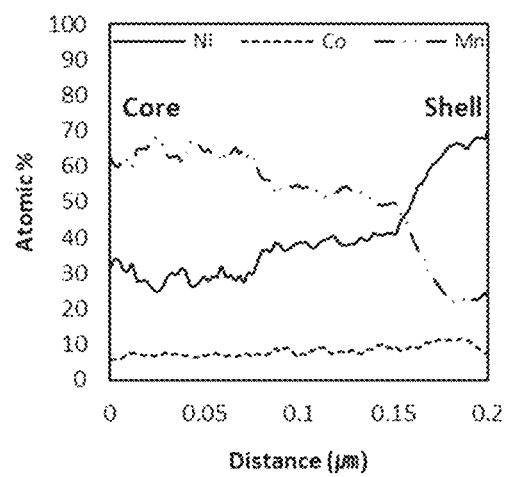
FIG. 4 is a graph (line sum spectrum) showing the change in content of a metal element (Ni, Co, or Mn) present in a lithium manganese-based oxide through EDS analysis in a direction displayed in the cross-sectional TEM image of FIG. 3.

Referring to FIGS. 3 and 4, the lithium manganese-based oxide included in the positive electrode active material according to Example 2 is a secondary particle including a plurality of primary particles, and it can be confirmed that of the gradient concentrations of Ni, Co and Mn are formed in a direction from the shell to core of a secondary particle.

Likewise, it can be confirmed that the concentration gradients of Ni, Co and Mn formed in a direction from the shell to core of the secondary particle occurs because $M^2/M^1$ and $M^3/M^1$ calculated from the average composition of all metal elements in the core of the secondary particle, and $M^2/M^1$ and $M^3/M^1$ calculated from the average composition of all metal elements in the shell of the secondary particle are different.

In addition, it can be confirmed that the concentration of Ni in the secondary particle is higher as closer to the outermost surface of the secondary particle.

Table 2 below shows the concentrations (mol %) of Ni, Co and Mn in the core and shell of a secondary particle. The concentrations (mol %) of Ni, Co and Mn in the core and shell of a secondary particle were calculated from a line EDS spectrum, and the concentrations of Ni, Co and Mn in total particles (bulk) were calculated through ICP analysis. Wherein, the shell corresponds to the shell of a secondary particle located outside the region corresponding to the core of the secondary particle based on the direction shown in the cross-sectional TEM image of FIG. 3.

TABLE 2

| $M/M_{total}$ (mol %) | bulk | core | shell |
| --- | --- | --- | --- |
| Ni | 36.0 | 33.7 | 67.9 |
| Co | 9.8 | 5.9 | 7.7 |
| Mn | 54.2 | 60.3 | 24.4 |

Referring to FIG. 4 and Table 2, $M^2/M^1$ calculated from the average composition of all metal elements in the core of the secondary particle is 33.7, and $M^2/M^1$ calculated from the average composition of all metal elements in the shell of the secondary particle is 67.9. Therefore, it can be seen that the lithium manganese-based oxide is a secondary particle in which $M^2/M^1$ in the shell is higher than $M^2/M^1$ in the core, and a gradient in which $M^2/M^1$ decreases from the shell to the core is formed.

Figure 5:
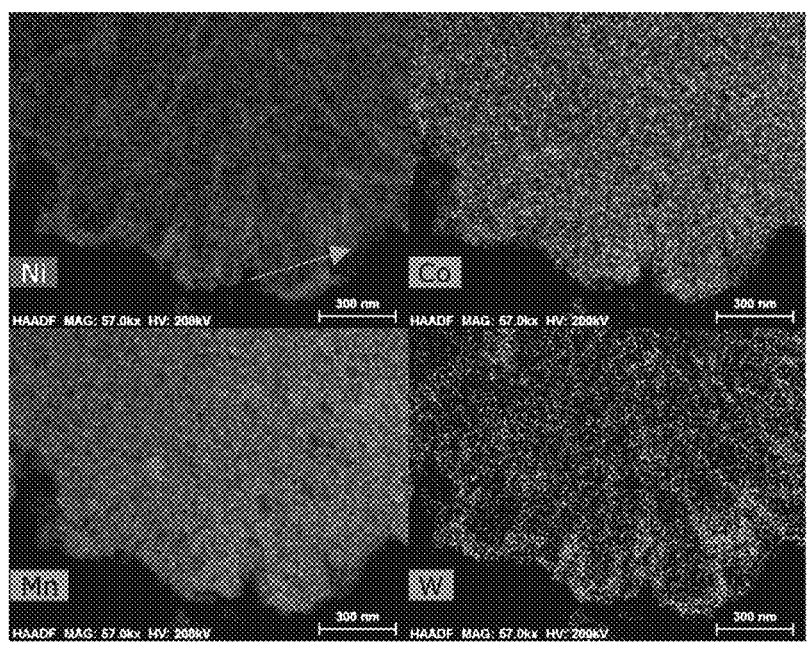
FIG. 5 is a cross-sectional TEM image of a lithium manganese-based oxide included in a positive electrode active material according to Example 3, and shows the distribution of each of Ni, Co, Mn and W elements through EDS mapping of the cross-section of the lithium manganese-based oxide.

FIG. 5 is a cross-sectional TEM image of a lithium manganese-based oxide included in a positive electrode active material according to Example 3, and shows the distribution of each of Ni, Co, Mn and W elements through EDS mapping of the cross-section of the lithium manganese-based oxide. In addition, FIG. 6 is a graph (line sum spectrum) showing the change in content of a metal element (Ni, Co, Mn, or W) present in a lithium manganese-based oxide through EDS analysis in a direction displayed in the cross-sectional TEM image of FIG. 5.

Figure 6:
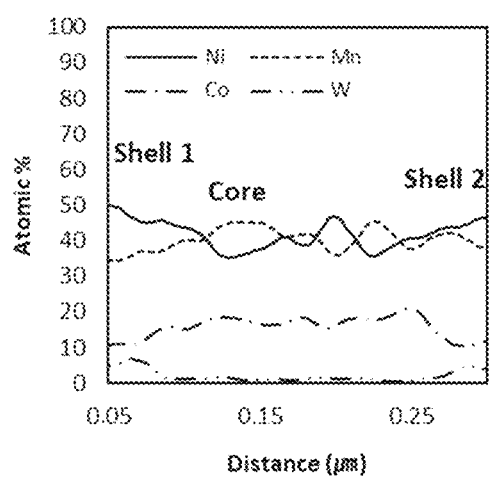
FIG. 6 is a graph (line sum spectrum) showing the change in content of a metal element (Ni, Co, Mn, or W) present in a lithium manganese-based oxide through EDS analysis in a direction displayed in the cross-sectional TEM image of FIG. 5.

Referring to FIGS. 5 and 6, the lithium manganese-based oxide included in the positive electrode active material according to Example 3 is a secondary particle including a plurality of primary particles, and it can be confirmed that the gradient concentrations of Ni, Co, Mn and W are formed in a direction crossing almost perpendicular to the direction from the shell to core of the secondary particle.

Likewise, it can be confirmed that the concentration gradients of Ni, Co, Mn and W formed in a direction crossing almost perpendicular to the direction from the shell to core of the secondary particle occurs because $M^2/M^1$ and $M^3/M^1$ calculated from the average composition of all metal elements in the core of a primary particle, and $M^2/M^1$ and $M^3/M^1$ calculated from the average composition of all metal elements in the shell of the primary particle are different.

In addition, it can be confirmed that the concentrations of Ni and W in the secondary particle are higher as closer to the grain boundary between the primary particles.

Table 3 below shows the concentrations (mol %) of Ni, Co, Mn and W in the core and shells (shell 1 and shell 2) of a primary particle. The concentrations (mol %) of Ni, Co, Mn and W in the core and shells (shell 1 and shell 2) of a primary particle were calculated from a line EDS spectrum, and the concentrations of Ni, Co, Mn and W in total particles (bulk) were calculated through ICP analysis. Wherein, the shell (shell 1) corresponds to the shell of a primary particle located at one side of the region corresponding to a core of the primary particle based on the direction shown in the cross-sectional TEM image of FIG. 5, and the shell (shell 2) corresponds to a shell of a primary particle located at the other side of the region corresponding to the core of the primary particle based on the direction shown in the cross-sectional TEM image of FIG. 5.

TABLE 3

| $M/M_{total}$ (mol %) | bulk | core | shell 1 | shell 2 |
|---|---|---|---|---|
| Ni | 35.2 | 36.6 | 49.4 | 46.3 |
| Co | 9.7 | 17.6 | 10.9 | 11.6 |
| Mn | 54.0 | 45.1 | 34.8 | 38.1 |
| W | 1.1 | 0.7 | 4.8 | 4.0 |

Referring to the results shown in FIG. 6 and Table 3, $M^2/M^1$ calculated from the average composition of all metal elements in the core of a primary particle is 36.6, and $M^2/M^1$ calculated from the average compositions of all metal elements in each shell (shell 1 or shell 2) of the primary particle is 49.4 or 46.3, respectively. Therefore, it can be seen that the lithium manganese-based oxide includes a primary particle in which $M^2/M^1$ in a shell is higher than $M^2/M^1$ in the core, and a gradient in which $M^2/M^1$ decreases from the shell to the core is formed.

In addition, $M^3/M^1$ calculated from the average composition of all metal elements in the core of a primary particle is 0.7, and $M^3/M^1$ calculated from the average composition of all metal elements in each shell (shell 1 or shell 2) of the primary particle is 4.8 or 4.0, respectively. Therefore, it can be seen that the lithium manganese-based oxide includes a primary particle in which $M^3/M^1$ in a shell is higher than $M^3/M^1$ in the core, and a gradient in which $M^3/M^1$ decreases from the shell to the core is formed.

In addition, referring to FIG. 6, it can be confirmed that a gradient of $M^2/M^1$ is repeatedly present between a core and a shell (shell 2) (region from 0.15 μm to 0.25 μm based on the line EDS spectrum). This result is due the fact that the lithium manganese-based oxide included in the positive electrode active material according to Example 3 is a secondary particle including a plurality of primary particles, and also that the primary particle includes a plurality of crystallites and has a gradient in which $M^2/M^1$ decreases from the shell to core of the crystallite.

Tables 4 to 7 below show the measurement results of the concentrations of metal elements in the core and shell of a primary particle constituting the lithium manganese-based oxides included in the positive electrode active materials according to Examples 4 to 7 through line EDS analysis and ICP analysis, and it can be confirmed that, like the above-described positive electrode active materials according to various examples, the difference in concentration of the metal elements between the shell and the core is implemented. Wherein, based on the line scanning direction crossing the core of a primary particle in a straight line, the shell (shell 1) corresponds to a shell of a primary particle located at one side of the region corresponding to the core of the primary particle, and the shell (shell 2) corresponds to a shell of the primary particle located at the other side of the region corresponding to the core of the primary particle.

TABLE 4

| $M/M_{total}$ (mol %) | bulk | core | shell 1 | shell 2 |
|---|---|---|---|---|
| Ni | 42.3 | 36.8 | 65.5 | 56.3 |
| Mn | 57.7 | 63.2 | 34.5 | 43.7 |

TABLE 5

| $M/M_{total}$ (mol %) | bulk | core | shell 1 | shell 2 |
|---|---|---|---|---|
| Ni | 41.90 | 38.3 | 55.7 | 58.7 |
| Mn | 57.09 | 61.2 | 40.9 | 37.1 |
| W | 1.01 | 0.5 | 3.4 | 4.2 |

TABLE 6

| $M/M_{total}$ (mol %) | bulk | core | shell 1 | shell 2 |
|---|---|---|---|---|
| Ni | 36.0 | 34.09 | 47.25 | 42.9 |
| Co | 9.6 | 10.4 | 12.1 | 11.6 |
| Mn | 53.8 | 55.3 | 38.7 | 43.4 |
| Nb | 0.55 | 0.21 | 1.95 | 2.1 |

TABLE 7

| $M/M_{total}$ (mol %) | bulk | core | shell 1 | shell 2 |
|---|---|---|---|---|
| Ni | 36.1 | 35.5 | 50.4 | 44.98 |
| Co | 9.6 | 9.7 | 10.4 | 11.1 |

TABLE 7-continued

| M/M$_{total}$ (mol %) | bulk | core | shell 1 | shell 2 |
|---|---|---|---|---|
| Mn | 53.8 | 54.7 | 37.9 | 43.2 |
| Mo | 0.5 | 0.1 | 1.3 | 0.72 |

FIG. 7 is a cross-sectional TEM image of a lithium manganese-based oxide included in a positive electrode active material according to Example 8, and shows the distribution of each of Ni, Co and Mn through EDS mapping of the cross-section of the lithium manganese-based oxide. In addition, FIG. 8 is a graph (line sum spectrum) showing the change in content of a metal element (Ni, Co, Mn, or W) present in a lithium manganese-based oxide through EDS analysis in direction ① displayed in the cross-sectional TEM image of FIG. 7, and FIG. 9 is a graph (line sum spectrum) showing the change in content of a metal element (Ni, Co, Mn, or W) present in a lithium manganese-based oxide through EDS analysis in direction ② displayed in the cross-sectional TEM image of FIG. 7.

Figure 8:
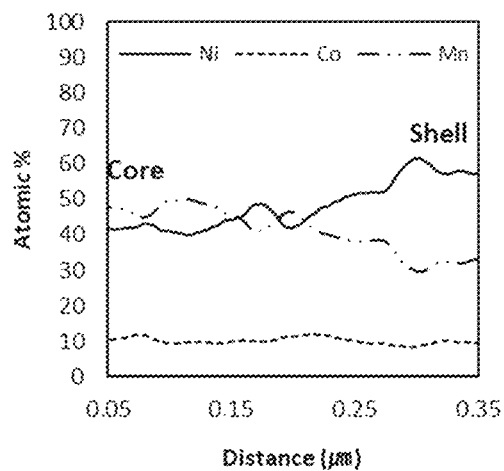
FIG. 8 is a graph (line sum spectrum) showing the change in content of a metal element (Ni, Co, Mn, or W) present in a lithium manganese-based oxide through EDS analysis in direction ① (displayed in the cross-sectional TEM image of FIG. 7.
Figure 9:
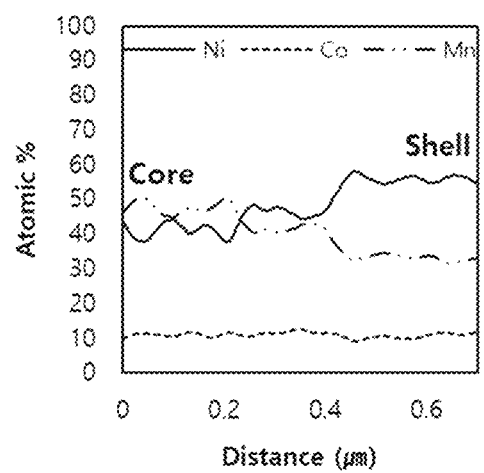
FIG. 9 is a graph (line sum spectrum) showing the change in content of a metal element (Ni, Co, Mn, or W) present in a lithium manganese-based oxide through EDS analysis in direction ② displayed in the cross-sectional TEM image of FIG. 7.

Referring to FIGS. 7 to 9, it can be confirmed that the crystal sizes of particles constituting the lithium manganese-based oxide included in the positive electrode active material according to Example 8 is larger than those of the particles constituting the lithium manganese-based oxides shown in FIGS. 1, 3 and 5. It is determined that such differences are caused by conditions for first thermal treatment, and it can be confirmed that the crystal growth of the particles constituting the lithium manganese-based oxide included in the positive electrode active material according to Example 8 is promoted by thermal treatment of a hydroxide precursor at a higher temperature for a long time.

The direction ① displayed in the cross-sectional TEM image of FIG. 7 is for checking the concentrations of metal elements (Ni, Co, and Mn) in a primary particle, and Table 8 below shows the concentrations (mol %) of Ni, Co and Mn in the core and shell of the primary particle. The concentrations (mol %) of Ni, Co and Mn in the core and shell of the primary particle were calculated from a line EDS spectrum, and the concentrations of Ni, Co and Mn in total particles (bulk) were calculated through ICP analysis. Wherein, the shell corresponds to a shell of the primary particle located outside the region corresponding to the core of the primary particle based on the direction ① displayed in the cross-sectional TEM image of FIG. 7.

TABLE 8

| M/M$_{total}$ (mol %) | bulk | core | shell |
|---|---|---|---|
| Ni | 36.7 | 41.7 | 57.3 |
| Co | 9.6 | 10.6 | 9.6 |
| Mn | 53.7 | 47.8 | 33.1 |

Referring to the results shown in FIG. 8 and Table 8, $M^2/M^1$ calculated from the average composition of all metal elements in the core of a primary particle is 41.7, and $M^2/M^1$ calculated from the average composition of all metal elements in the shell of the primary particle is 57.3. Therefore, it can be seen that the lithium manganese-based oxide includes a primary particle in which, $M^2/M^1$ in the shell is higher than $M^2/M^1$ in the core and a gradient in which $M^2/M^1$ decreases from the shell to the core.

The direction ② displayed in the cross-sectional TEM image of FIG. 7 is for checking the concentrations of metal elements (Ni, Co, and Mn) in a secondary particle, and Table 9 below shows the concentrations (mol %) of Ni, Co and Mn in the core and shell of the secondary particle. The concentrations (mol %) of Ni, Co and Mn in the core and shell of the secondary particle were calculated from a line EDS spectrum, and the concentrations of Ni, Co and Mn in total particles (bulk) were calculated through ICP analysis. Wherein, the shell corresponds to a shell of the secondary particle located outside the region corresponding to the core of the secondary particle based on the direction ② displayed in the cross-sectional TEM image of FIG. 7.

TABLE 9

| M/M$_{total}$ (mol %) | bulk | core | shell |
|---|---|---|---|
| Ni | 36.7 | 41.4 | 55.2 |
| Co | 9.6 | 10.6 | 11.7 |
| Mn | 53.7 | 48.0 | 33.1 |

Referring to the results of FIG. 9 and Table 9, $M^2/M^1$ calculated from the average composition of all metal elements in the core of a secondary particle is 41.4, and $M^2/M^1$ calculated from the average composition of all metal elements in the shell of the secondary particle is 55.2. Accordingly, it can be seen that the lithium manganese-based oxide includes a secondary particle in which $M^2/M^1$ in the shell is higher than $M^2/M^1$ in the core, and a gradient in which $M^2/M^1$ decreases from the shell to the core is formed.

Referring to the results of FIGS. 7 to 9, it can be confirmed that the lithium manganese-based oxide is a secondary particle that includes a primary particle in which $M^2/M^1$ in the shell is higher than $M^2/M^1$ in the core and a gradient in which $M^2/M^1$ decreases from the shell to the core is formed, or a secondary particle itself in which $M^2/M^1$ in the shell is higher than $M^2/M^1$ in the core and a gradient in which $M^2/M^1$ decreases from the shell to the core is formed.

In other words, in the lithium manganese-based oxide, the unit of a particle in which $M^2/M^1$ in the shell is higher than $M^2/M^1$ in the core and a gradient in which $M^2/M^1$ decreases from the shell to the core may be a primary particle and/or a secondary particle, or a crystallite unit constituting a primary particle.

Figure 10:
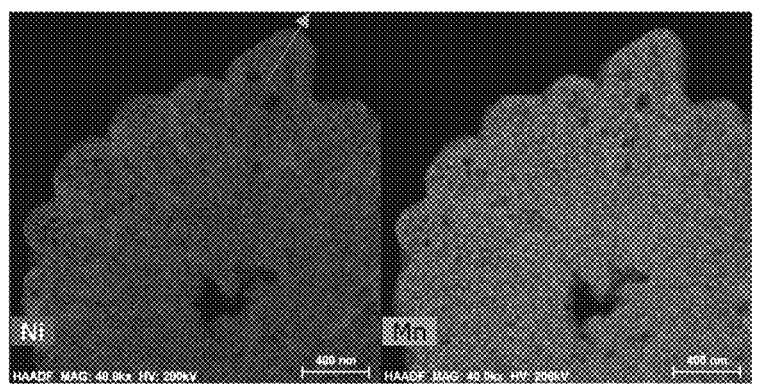
FIG. 10 is a cross-sectional TEM image of a lithium manganese-based oxide included in a positive electrode active material according to Comparative Example 1, and shows the distribution of each of Ni and Mn elements through EDS mapping of the cross-section of the lithium manganese-based oxide.
Figure 11:
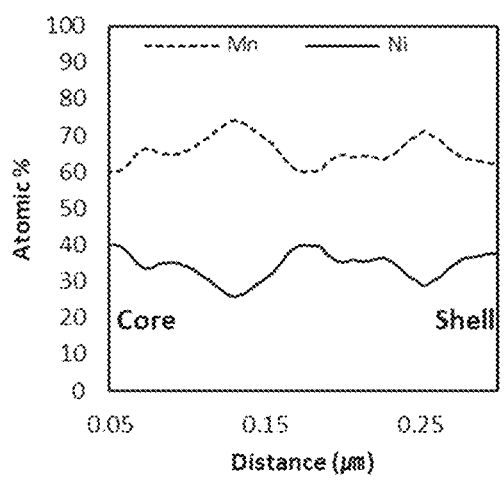
FIG. 11 is a graph (line sum spectrum) showing the change in content of a metal element (Ni or Mn) present in a lithium manganese-based oxide through EDS analysis in a direction displayed in the cross-sectional TEM image of FIG. 10.

FIG. 10 is a cross-sectional TEM image of a lithium manganese-based oxide included in a positive electrode active material according to Comparative Example 1, and shows the distribution of each of Ni and Mn elements through EDS mapping of the cross-section of the lithium manganese-based oxide. In addition, FIG. 11 is a graph (line sum spectrum) showing the change in content of a metal element (Ni or Mn) present in a lithium manganese-based oxide through EDS analysis in a direction displayed in the cross-sectional TEM image of FIG. 10.

In addition, Table 10 below shows the concentrations (mol %) of Ni and Mn in the core and shell of a primary particle. The concentrations (mol %) of Ni and Mn in the core and shell of a primary particle were calculated from a line EDS spectrum, and the concentrations of Ni and Mn in total particles (bulk) were cultured by ICP analysis.

TABLE 10

| M/M$_{total}$ (mol %) | bulk | core | shell |
|---|---|---|---|
| Ni | 38.7 | 37.9 | 37.6 |
| Mn | 61.3 | 62.1 | 62.4 |

Referring to FIGS. 10 and 11, it can be confirmed that the lithium manganese-based oxide included in the positive electrode active material according to Comparative Example 1 is a secondary particle including a plurality of primary particles, and there is no gradient concentrations of Ni and Mn between the core and shell of a primary particle present at the outermost surface of the secondary particle.

Table 11 below shows the measurement results of the concentration of metal elements in the core and shell of each of a primary particle and a secondary particle, constituting the lithium manganese-based oxide included in the positive electrode active material according to Comparative Example 2 through line EDS analysis and ICP analysis, and it can be confirmed that, unlike the above-described positive electrode active material according to Example 8, there is almost no difference in concentration of metal elements between the shell and the core.

TABLE 11

| $M/M_{total}$ (mol %) | Primary particle | | Secondary particle | |
| --- | --- | --- | --- | --- |
| | core | shell | core | shell |
| Ni | 42.1 | 41.1 | 43.5 | 40.2 |
| Mn | 57.9 | 58.9 | 56.5 | 59.8 |

Experimental Example 2. Evaluation of Electrochemical Properties of Lithium Secondary Battery A charging/discharging experiment was performed on each of the lithium secondary batteries (coin cells) manufactured in Preparation Example 2 using an electrochemical analyzer (Toyo, Toscat-3100) at 25° C. in a voltage range of 2.0V to 4.6V at a discharge rate of 0.1 C to 5.0 C to measure an initial charge capacity, an initial discharge capacity, an initial reversible efficiency, and a rate characteristic (rate capability (C-rate)).

In addition, after 50 cycles of charging/discharging of the same lithium secondary battery at 25° C. in an operating voltage range of 2.0V to 4.6V under a condition of 1 C/1 C, the rate capability at the 50$^{th}$ cycle relative to the initial capacity (capacity retention) was measured.

The measurement results are shown in Tables 12 and 13 below.

TABLE 12

| | Classification | | |
| --- | --- | --- | --- |
| | Initial charge capacity (0.1 C-rate) | Initial discharge capacity (0.1 C-rate) | Initial reversible efficiency |
| | Units | | |
| | mAh/g | mAh/g | % |
| Example 1 | 251.3 | 222.5 | 89 |
| Example 2 | 254.5 | 224.8 | 88 |
| Example 3 | 247.9 | 229.0 | 92 |
| Example 4 | 251.6 | 217.8 | 87 |
| Example 5 | 247.9 | 218.9 | 88 |
| Example 6 | 251.9 | 225.6 | 90 |
| Example 7 | 253.8 | 226.5 | 89 |
| Example 8 | 256.0 | 196.8 | 77 |
| Comparative Example 1 | 227.8 | 198.0 | 87 |
| Comparative Example 2 | 213.3 | 176.8 | 83 |

TABLE 13

| | Classification | | | |
| --- | --- | --- | --- | --- |
| | Discharge capacity (1 C-rate) | Capacity retention (1 C-rate, 50 cycle) | Rate capability (2 C/0.1 C) | Rate capability (5 C/0.1 C) |
| | Units | | | |
| | mAh/g | % | % | % |
| Example 1 | 184.4 | 91 | 75 | 63 |
| Example 2 | 196.5 | 95 | 82 | 72 |
| Example 3 | 207.8 | 97 | 85 | 77 |
| Example 4 | 186.1 | 96 | 78 | 66 |
| Example 5 | 196.6 | 97 | 83 | 72 |
| Example 6 | 199.7 | 96 | 84 | 75 |
| Example 7 | 201.7 | 95 | 84 | 75 |
| Example 8 | 159.2 | 91 | 72 | 59 |
| Comparative Example 1 | 148.8 | 87 | 63 | 43 |
| Comparative Example 2 | 112.6 | 66 | 41 | 18 |

Referring to Tables 12 and 13, compared with lithium secondary batteries using the positive electrode active materials according to Comparative Examples 1 and 2, as the discharge capacities of lithium secondary batteries using the positive electrode active materials according to Examples 1 to 8 increase, it can be confirmed that reversible efficiency is improved, and a capacity retention and a rate capability increase.

In the above, the embodiments of the present invention have been described, but it will be understood by those of ordinary skill in the art that the present invention may be changed and modified in various ways by addition, alteration, or deletion of components without departing from the spirit of the present invention defined in the appended claims.

The invention claimed is:

1. A positive electrode active material, comprising:
an overlithiated lithium manganese-based oxide comprising a core and a shell, and comprising at least lithium, nickel, and manganese,
wherein the lithium manganese-based oxide comprises a C2/m phase and a R3-m phase,
wherein when the number of moles of all transition metal elements in the lithium manganese-based oxide is $M^1$ and the number of moles of nickel is $M^2$, $M^2/M^1$ calculated from the average composition of all transition metal elements in the core of the lithium manganese-based oxide and $M^2/M^1$ calculated from the average composition of all transition metal elements in the shell of the lithium manganese-based oxide are different,
wherein the lithium manganese-based oxide is represented by Formula 1 below, $$rLi_2MnO_3 \cdot (1-r)Li_aNi_xCo_yMn_zM1_{1-(x+y+z)}O_2, \text{ and}$$ [Formula 1]

wherein,
M1 is at least one selected from Mo, Nb, Fe, Cr, V, Cu, Zn, Sn, Mg, Ru, Al, Ti, Zr, B, Na, K, Y, P, Ba, Sr, La, Ga, Gd, Sm, W, Ca, Ce, Ta, Sc, In, S, Ge, Si and Bi, $0<r\le0.7$, $0<a\le1$, $0<x\le1$, $0\le y<1$, $0<z<1$, and $0<x+y+z\le1$.

2. The positive electrode active material of claim 1, wherein the lithium manganese-based oxide is a secondary particle comprising at least one primary particle, and
wherein the secondary particle comprises at least one primary particle in which $M^2/M^1$ calculated from the average composition of all transition metal elements in the core and $M^2/M^1$ calculated from the average composition of all transition metal elements in the shell are different.

3. The positive electrode active material of claim 1, wherein the lithium manganese-based oxide is a secondary particle comprising at least one primary particle, and
$M^2/M^1$ calculated from the average composition of all transition metal elements in the core of the secondary particle and $M^2/M^1$ calculated from the average composition of all transition metal elements in the shell of the secondary particle are different.

4. The positive electrode active material of claim 1, wherein the lithium manganese-based oxide is a secondary particle comprising at least one primary particle,
wherein the primary particle comprises at least one crystallite in which $M^2/M^1$ calculated from the average composition of all transition metal elements in the core and $M^2/M^1$ calculated from the average composition of all transition metal elements in the shell are different.

5. The positive electrode active material of claim 1, wherein $M^2/M^1$ in the shell of the lithium manganese-based oxide is higher than $M^2/M^1$ in the core of the lithium manganese-based oxide.

6. The positive electrode active material of claim 5, wherein a gradient in which $M^2/M^1$ decreases from the shell to core of the lithium manganese-based oxide is formed.

7. The positive electrode active material of claim 1, wherein the lithium manganese-based oxide further comprises a doping metal, and
when the number of moles of all transition metal elements in the lithium manganese-based oxide is $M^1$, and the number of moles of a doping metal is $M^3$,
$M^3/M^1$ calculated from the average composition of all transition metal elements in the core of the lithium manganese-based oxide and $M^3/M^1$ calculated from the average composition of all transition metal elements in the shell of the lithium manganese-based oxide are different.

8. The positive electrode active material of claim 7, wherein the lithium manganese-based oxide is a secondary particle comprising at least one primary particle, and
wherein the secondary particle comprises at least one primary particle in which $M^3/M^1$ calculated from the average composition of all transition metal elements in the core and $M^3/M^1$ calculated from the average composition of all transition metal elements in the shell are different.

9. The positive electrode active material of claim 7, wherein the lithium manganese-based oxide is a secondary particle comprising at least one primary particle, and
$M^3/M^1$ calculated from the average composition of all transition metal elements in the core of the secondary particle and $M^3/M^1$ calculated from the average composition of all transition metal elements in the shell of the secondary particle are different.

10. The positive electrode active material of claim 7, wherein the lithium manganese-based oxide is a secondary particle comprising at least one primary particle,
the primary particle comprises at least one crystallite in which $M^3/M^1$ calculated from the average composition of all transition metal elements in the core and $M^3/M^1$ calculated from the average composition of all transition metal elements in the shell are different.

11. The positive electrode active material of claim 7, wherein $M^3/M^1$ in the shell of the lithium manganese-based oxide is higher than $M^3/M^1$ in the core of the lithium manganese-based oxide.

12. The positive electrode active material of claim 11, wherein a gradient in which $M^3/M^1$ decreases from the shell to core of the lithium manganese-based oxide is formed.

13. The positive electrode active material of claim 1, wherein there is at least one metal oxide represented by Formula 2 below on at least a part of the surface of the lithium manganese-based oxide:

$$Li_bM_{2c}O_d \qquad \text{[Formula 2]}$$

Wherein,
M2 is at least one selected from Ni, Mn, Co, Fe, Cu, Nb, Mo, Ti, Al, Cr, Zr, Zn, Na, K, Ca, Mg, Pt, Au, P, Eu, Sm, W, Ce, V, Ba, Ta, Sn, Hf, Gd and Nd,
$0 \le b \le 8$, $0 < c \le 8$, and $2 \le d \le 13$.

14. A positive electrode comprising the positive electrode active material of claim 1.

15. A lithium secondary battery using the positive electrode of claim 14.

* * * * *